United States Patent
Andreani

(10) Patent No.: US 8,517,315 B2
(45) Date of Patent: Aug. 27, 2013

(54) LATERAL COUPLING DEVICE FOR HOLDING AND GUIDING AT LEAST ONE AERODYNAMIC BODY RELATIVE TO THE MAIN WING OF AN AIRCRAFT, AIRFOIL AND AIRCRAFT WITH SUCH A LATERAL COUPLING DEVICE

(75) Inventor: Luc Andreani, Bremen (DE)

(73) Assignee: Airbus Operations GmbH, Hamburg (DE)

( * ) Notice: Subject to any disclaimer, the term of this patent is extended or adjusted under 35 U.S.C. 154(b) by 255 days.

(21) Appl. No.: 12/989,089

(22) PCT Filed: Apr. 23, 2009

(86) PCT No.: PCT/EP2009/002964
§ 371 (c)(1),
(2), (4) Date: Dec. 1, 2010

(87) PCT Pub. No.: WO2009/130025
PCT Pub. Date: Oct. 29, 2009

(65) Prior Publication Data
US 2011/0073712 A1   Mar. 31, 2011

Related U.S. Application Data

(60) Provisional application No. 61/047,467, filed on Apr. 24, 2008.

(30) Foreign Application Priority Data

Apr. 24, 2008   (DE) .......................... 10 2008 020 654

(51) Int. Cl.
*B64C 3/50*   (2006.01)

(52) U.S. Cl.
USPC ........................................ 244/215

(58) Field of Classification Search
USPC .................. 244/211–215, 35 R, 219, 216
See application file for complete search history.

(56) References Cited

U.S. PATENT DOCUMENTS

| | | | |
|---|---|---|---|
| 4,405,105 A | 9/1983 | Dilmaghani et al. | |
| 4,494,716 A | 1/1985 | Breedveld | |

(Continued)

FOREIGN PATENT DOCUMENTS

| | | |
|---|---|---|
| CN | 1130140 A | 9/1996 |
| CN | 1390742 A | 1/2003 |

(Continued)

OTHER PUBLICATIONS

International Search Report for corresponding PCT Application No. PCT/EP2009/002964, Sep. 11, 2009.

(Continued)

*Primary Examiner* — Tien Dinh
(74) *Attorney, Agent, or Firm* — Matthew B. Dernier, Esq.; Gibson & Dernier LLP

(57) ABSTRACT

A lateral coupling device for holding and guiding at least one aerodynamic body relative to the main wing in its wingspread direction during the adjustment thereof features: a coupling connection, a first coupling joint for coupling a first end of the coupling connection to the main wing or an aircraft component connected thereto or another aerodynamic body, as well as a second coupling joint for coupling the second end of the coupling connection to the aerodynamic body, where the lateral coupling device has a total of five degrees of freedom and allows an adjusting motion of the aerodynamic body relative to the main wing transverse to the wingspread direction thereof.

40 Claims, 11 Drawing Sheets

(56) References Cited

U.S. PATENT DOCUMENTS

| | | | |
|---|---|---|---|
| 4,614,320 | A | 9/1986 | Rutan |
| 4,715,567 | A | 12/1987 | Pccard |
| 5,201,479 | A | 4/1993 | Renzelmann |
| 5,735,485 | A | 4/1998 | Ciprian et al. |
| 7,546,984 | B2 | 6/2009 | Poppe |
| 7,708,226 | B2 | 5/2010 | Schievelbusch |
| 2006/0022093 | A1 | 2/2006 | Poppe |
| 2007/0051183 | A1 | 3/2007 | Schievelbusch |

FOREIGN PATENT DOCUMENTS

| | | |
|---|---|---|
| CN | 2574996 Y | 9/2003 |
| DE | 102004035921 B4 | 2/2006 |
| EP | 1637453 A | 3/2006 |
| GB | 2323577 A | 9/1998 |

OTHER PUBLICATIONS

Chinese Office Action for corresponding Chinese Patent Application No. 200980114634.7, dated Oct. 9, 2012.

LATERAL COUPLING DEVICE FOR HOLDING AND GUIDING AT LEAST ONE AERODYNAMIC BODY RELATIVE TO THE MAIN WING OF AN AIRCRAFT, AIRFOIL AND AIRCRAFT WITH SUCH A LATERAL COUPLING DEVICE

CROSS REFERENCE TO RELATED APPLICATIONS

This application claims priority to PCT Application No. PCT/EP2009/002964, filed Apr. 23, 2009; which claims priority to German Patent Application No. DE 10 2008 020 654.7, filed Apr. 24, 2008, and claims the benefit to U.S. Provisional Patent Application No. 61/047,467, filed Apr. 24, 2008, the entire disclosures of which applications are hereby incorporated by reference.

BACKGROUND

The invention pertains to a lateral coupling device for holding and guiding at least one aerodynamic body relative to the main wing of an aircraft, to an airfoil and to an aircraft with such a lateral coupling device.

EP 1 637 453 discloses a device for measuring deviations with regard to the synchronization of high lift flaps.

In known high-lift systems of modern commercial aircraft and transport aircraft, particularly those with a high takeoff weight, air flaps in the form of high-lift flaps are provided, e.g., on the trailing wing edge and movably connected to the airfoil by means of several driving stations. In order to actuate a flap, a torsion shaft is set in rotation by a flap drive that is arranged, e.g., centrally in the aircraft and this rotation is transmitted to control mechanisms for adjusting the air flap via coupling elements. Air flap suspensions introduce the landing flap loads into the aircraft structure by means of fixed bearing suspensions, movable bearing suspensions and landing flap drives. On fixed bearing suspensions, the lateral loads (X-loads) are usually introduced by means of deflection in this case.

Since the lateral loads on fixed bearing suspensions are introduced by means of deflection, wider fixed bearing suspensions are required, particularly when the rotational axes of the landing flaps are spaced apart from the lower wing surface by larger distances, wherein these wider fixed bearing suspensions result in higher weights and aerodynamically unfavorable solutions (wider fairings). In aircraft with an inner and an outer landing flap and differently inclined rotational axes of the landing flaps with fixed bearing suspensions, overlaps furthermore occur in the region of the point of separation when the two landing flaps are displaced such that the seal between the two landing flaps becomes more complex. The negative effects are further amplified by a higher cruising speed of the aircraft and a more significantly backswept wing.

SUMMARY OF THE INVENTION

It is the objective of the invention to make available an airfoil, in which a weight-saving coupling between the main wing and the air flap can be achieved, particularly when using soft wing structures.

This objective is attained with the characteristics of one or more embodiments disclosed and described herein. Advantageous embodiments and additional developments of the inventive high-lift system are also disclosed and described herein.

One advantage of the invention is the option of reducing the weight of the suspensions and the corresponding fairings of the aerodynamic regulating flaps, control flaps or air flaps in general, i.e., the fixed bearing suspension of the landing flaps, because no direct introduction of X-loads of the landing flap into the suspensions that are pivotably coupled parallel to the flight direction and the fixed suspension carriers on the wing or the fuselage is required. In addition, it is possible to reduce the weight of the flap drive with short load paths in the support of the landing flap drives on the suspension carriers on the wing or the fuselage (e.g., in case of blocking).

In addition, the utilization of the invention makes it possible to reduce the aerodynamic resistance while cruising with narrower fairings of the landing flap suspensions that can be used due to the elimination or reduction of the fixed bearing suspension of the aerodynamic body and, e.g., the landing flaps.

If the invention is used in connection with landing flaps, it is furthermore possible to reduce the complexity of the seal in aircraft with an inner and outer landing flap and differently inclined rotational axes of the landing flaps by controlling the motion of the landing flaps in the wingspread direction. The introduction of the Y- and Z-loads of the landing flap into the aircraft structure can be realized, e.g., via the suspensions that are pivotably coupled parallel to the flight direction, the fixed suspension carriers on the wing or the fuselage and the landing flap drives that are supported on the fixed suspension carriers perpendicular to the flight direction. The X-loads of the landing flap can also be introduced into the wing or fuselage structure in the form of pure longitudinal forces via the lateral connecting rod.

If the invention is used in connection with landing flaps, the magnitude of the motion of the landing flaps in the wingspread direction can be defined during the displacement of the flaps by arranging the bearing positions of the lateral connecting rod on the landing flaps and the wing or fuselage structure accordingly.

According to the invention, a lateral coupling device for holding and guiding at least one aerodynamic body relative to the main wing in its wingspread direction during the adjustment thereof features: a coupling device, a first coupling joint for coupling a first end of the coupling connection to the main wing or another aircraft component such as, e.g., a fuselage component or another aerodynamic body, as well as a second coupling joint for coupling a second end of the coupling connection to the aerodynamic body, wherein the lateral coupling device has a total of five degrees of freedom and allows an adjusting motion of the aerodynamic body relative to the main wing transverse to the wingspread direction thereof. The coupling of the main wing and/or an aircraft component connected thereto and/or another aerodynamic body provided in dependence on the described applications is realized with the inventive lateral coupling device according to one of the described exemplary embodiments.

The invention furthermore proposes an airfoil of an aircraft with a main wing and at least one aerodynamic body that can be adjusted relative to the main wing transverse to its wingspread direction by means of a drive unit, with said airfoil featuring:

at least two connecting devices that are spaced apart from one another in the wingspread direction of the main wing and serve for guiding the aerodynamic body during the adjustment relative to the main wing, wherein said connecting devices support the aerodynamic body by means of an articulated connection such that it allows at least one rotational degree of freedom of the aerodynamic body relative to the main wing with a rotational axis that has a directional component transverse to the wingspread direction of the aerodynamic body;

a lateral coupling device for holding and guiding the at least one aerodynamic body relative to the main wing in its wingspread direction during the adjustment thereof, wherein said lateral coupling device features: a coupling connection, a first coupling joint for coupling a first end of the coupling device to the main wing or another aircraft component connected thereto or another aerodynamic body, as well as a second coupling joint for coupling a second end of the coupling device to the aerodynamic body, wherein the lateral coupling device has a total of five degrees of freedom and allows an adjusting motion of the aerodynamic body relative to the main wing transverse to the wingspread direction thereof.

In this case, at least two connecting devices for adjusting the aerodynamic body may, in particular, respectively feature: one respective carrier part that is mounted on the main wing, a suspension carrier, a first articulated connection with at least one rotational degree of freedom for coupling the aerodynamic body to the suspension carrier and a second articulated connection, by means of which the suspension carrier is coupled to the carrier part with at least one rotational degree of freedom, wherein the rotational degree of freedom of the second articulated connection about a rotational axis has a directional component in the wingspread direction of the aerodynamic body.

The invention furthermore proposes an airfoil of an aircraft with a main wing and at least two aerodynamic bodies that can be adjusted relative to the main wing transverse to its wingspread direction by means of a drive unit and are arranged adjacent to one another referred to the wingspread direction of the main wing, with said airfoil featuring: at least two connecting devices that are spaced apart from one another in the wingspread direction of the main wing and serve for guiding the aerodynamic body during the adjustment relative to the main wing, wherein said connecting devices support the aerodynamic body by means of an articulated connection such that it allows at least one rotational degree of freedom of the aerodynamic body relative to the main wing with a rotational axis that has a directional component transverse to the wingspread direction of the aerodynamic body, as well as an aforementioned lateral coupling device according to the invention for holding and guiding the at least two aerodynamic bodies relative to the main wing in its wingspread direction during the adjustment thereof. The inventive lateral coupling device couples the two aerodynamic bodies to one another, wherein a first coupling joint is arranged on one of the aerodynamic bodies and a second coupling joint that is connected to the first coupling joint via the coupling connection is arranged on the other aerodynamic body. Another lateral coupling device according to the invention alternatively or additionally couples the at least two adjacently arranged aerodynamic bodies.

The invention furthermore proposes an aircraft featuring a fuselage and an airfoil with a main wing and at least one aerodynamic body that can be adjusted relative to the main wing transverse to its wingspread direction by means of a drive unit, with said aircraft featuring: at least two connecting devices that are spaced apart from one another in the wingspread direction of the main wing and serve for guiding the aerodynamic body during the adjustment relative to the main wing, wherein said connecting devices support the aerodynamic body by means of an articulated connection such that it allows at least one rotational degree of freedom of the aerodynamic body relative to the main wing with a rotational axis that has a directional component transverse to the wingspread direction of the aerodynamic body, as well as an aforementioned lateral coupling device according to the invention for holding and guiding the at least one aerodynamic body relative to an aircraft component of the fuselage in its wingspread direction during the adjustment thereof. The lateral coupling device couples the aerodynamic body to the aircraft component, wherein a first coupling joint is arranged on the aircraft component and a second coupling joint, which is arranged adjacent to the first coupling joint referred to the wingspread direction of the main wing and connected to the first coupling joint via the coupling connection, is arranged on the aerodynamic body.

In the aforementioned instances, the aerodynamic body may respectively consist, in particular, of a trailing edge flap.

BRIEF DESCRIPTION OF THE DRAWINGS

Exemplary embodiments of the invention are described below with reference to the enclosed figures, in which.

DETAILED DESCRIPTION OF THE INVENTION

Figure 1:
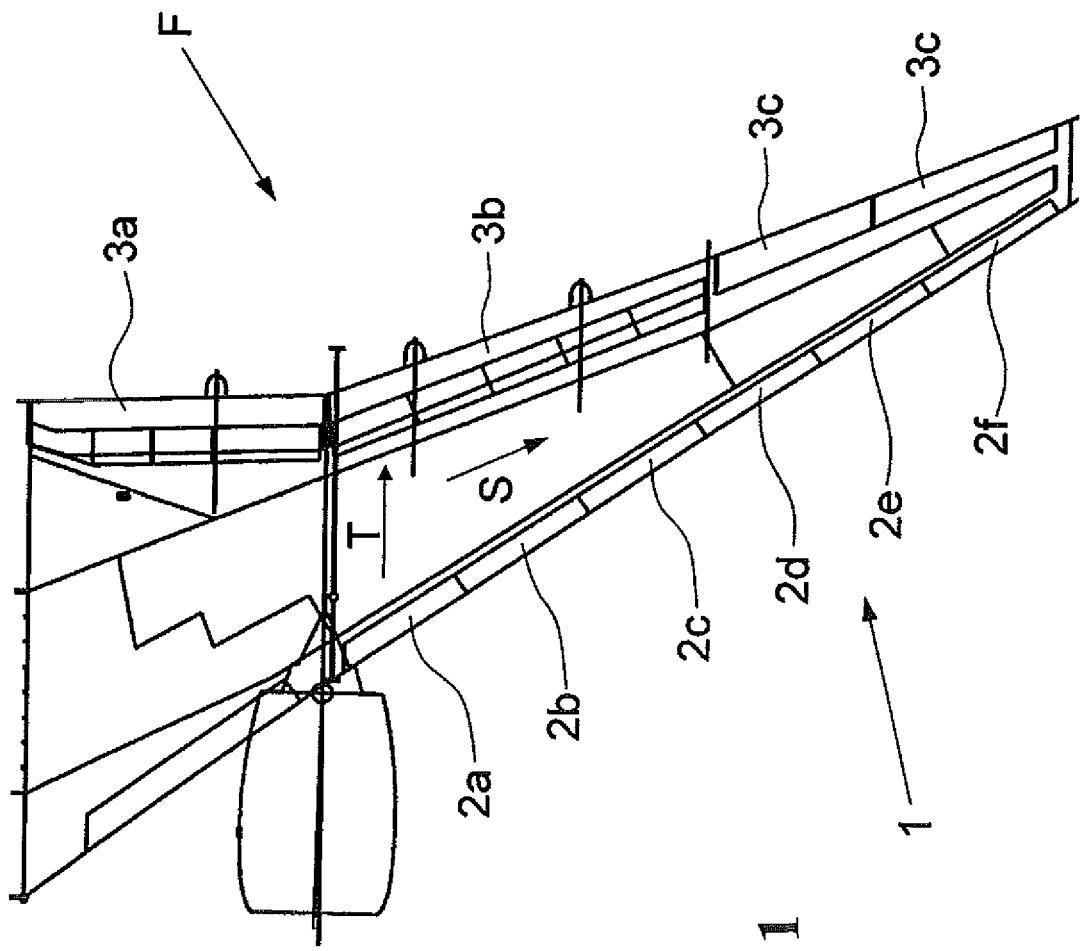
FIG. 1 shows a schematic representation of a wing of an aircraft with a main wing and several aerodynamic bodies such as leading edge slats and trailing edge flaps in order to form a high-lift system suitable for use in connection with embodiments of the invention.

FIG. 1 shows an airfoil F of a modern commercial or transport aircraft, the main wing 1 of which is provided with aerodynamic bodies or air flaps, e.g., in the form of slats 2a to 2f and trailing edge flaps 3a, 3b, as well as with other regulating flaps, on the leading wing edge and on the trailing wing edge. The main wing and at least one of the aerodynamic bodies or air flaps form, e.g., a high-lift system for increasing the lift, particularly during takeoffs and landings.

The invention is described below, in particular, with reference to an embodiment of an aerodynamic body in the form of a trailing edge flap that is identified by the reference symbol B in FIGS. 2 to 11 and applies analogously to other aerodynamic bodies such as slats, spoilers, ailerons or regulating flaps in general.

Figure 4:
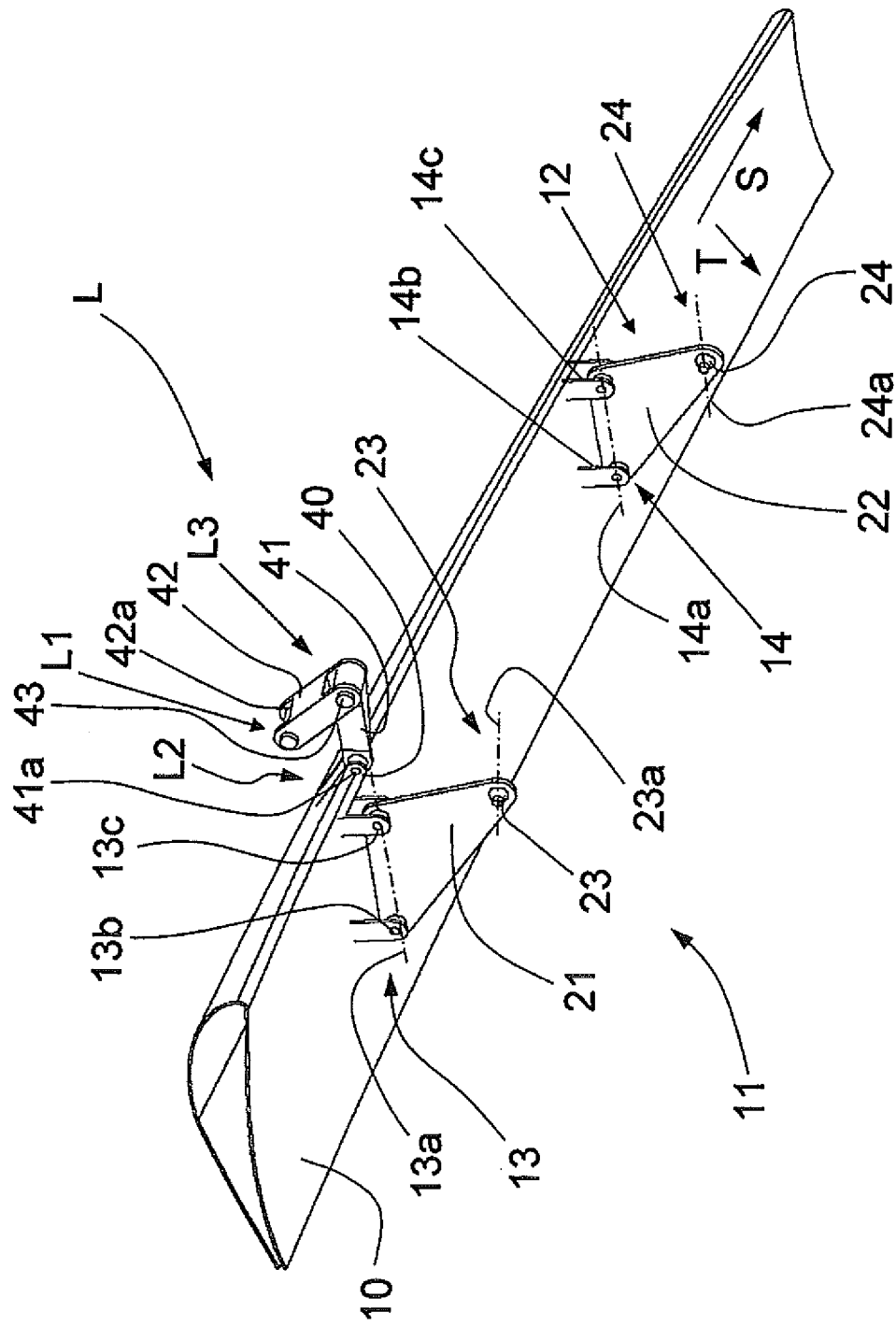
FIG. 4 shows an oblique bottom view of an aerodynamic body in the form of a trailing edge flap that forms part of an embodiment of the inventive airfoil, as well as an embodiment of the lateral coupling device provided in accordance with the invention.

The inventive airfoil of an aircraft and, e.g., the inventive high-lift system features a main wing 1 and at least one aerodynamic body B that can be adjusted relative to this main wing transverse to its wingspread direction S by means of a drive unit A. The airfoil features at least two connecting devices 11, 12 that are spaced apart from one another in the wingspread direction of the main wing and serve for guiding the aerodynamic body B during the adjustment relative to the main wing 1. Each connecting device 11, 12 supports the aerodynamic body B by means of a respective articulated connection 13 and 14 or first articulated connection such that it allows at least one rotational degree of freedom of the aerodynamic body relative to the main wing with a respective rotational axis 13a and 14a that has a directional component transverse to the wingspread direction S of the air flap. FIG. 4 shows a side view of an embodiment of the connecting device, in which a rotational axis 13a is schematically illustrated.

At least two or each of the connecting devices 11, 12 arranged on the aerodynamic body 2a, 2b, 2c; 3a, 3b, 3c; B for the adjustment thereof respectively feature(s), in particular: a respective carrier part 20 mounted on the main wing 1, a respective suspension carrier 21 and 22, a first articulated connection 13, 14, by means of which the respective suspension carrier 21 or 22 is coupled to the carrier part 20 with at least one rotational degree of freedom, and a respective second articulated connection 23 and 24 with at least one rotational degree of freedom for coupling the aerodynamic body B to the respective suspension carriers 21 and 22. The at least one rotational degree of freedom of the respective second articulated connection 23 and 24 is defined by respective rotational axes 23a and 24a with a directional component transverse to the wingspread direction of the air flap. Consequently, the direction of the respective rotational axis 23a or 24a of the respective second articulated connections 23 and 24 extends transverse or angular to the direction of the respective rotational axis 23a or 24a of the respective second articulated connections 23 and 24, i.e., not parallel and preferably at an angle greater than 45 degrees.

Figure 6:
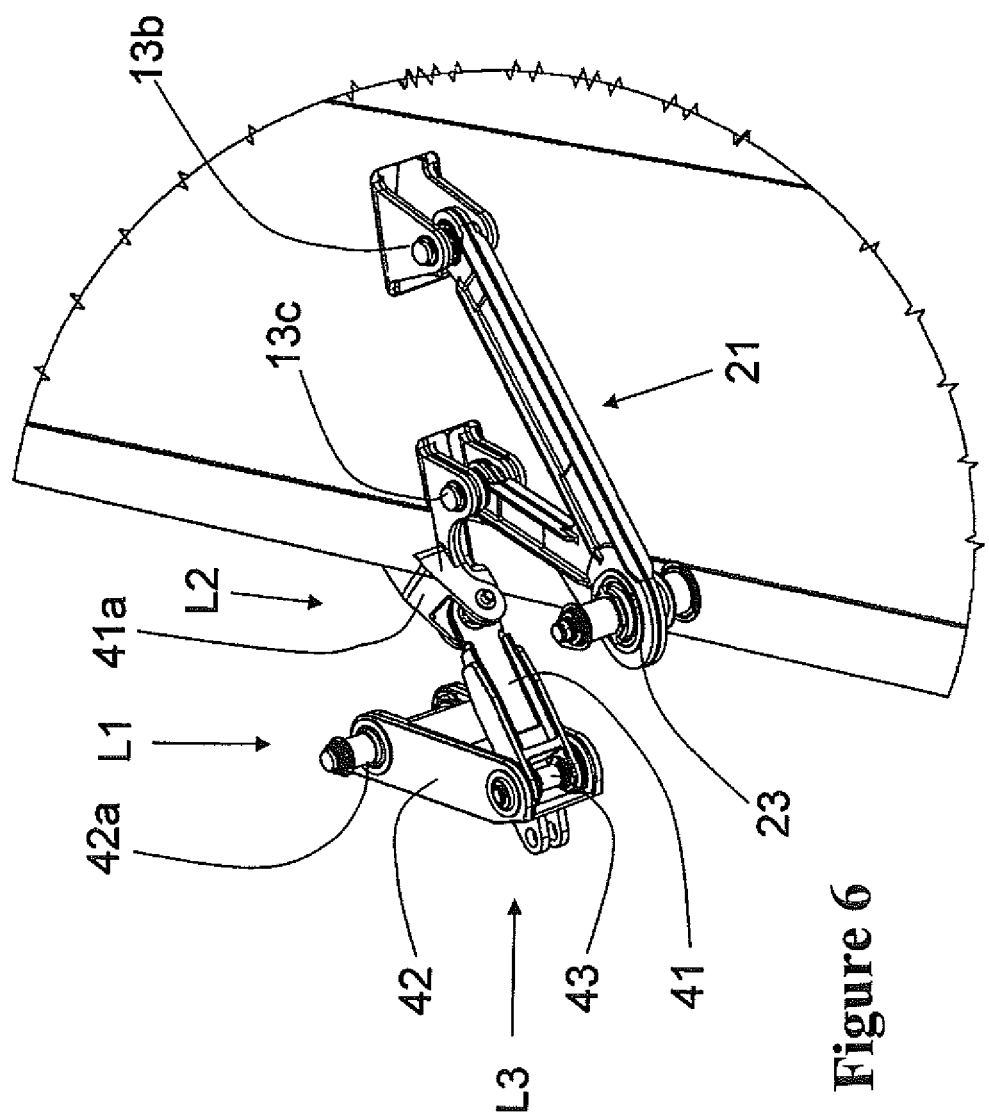
FIG. 6 shows an enlarged perspective representation of a detail of FIG. 4 with another exemplary embodiment of a connecting device and another exemplary embodiment of a lateral coupling device.
Figure 7:
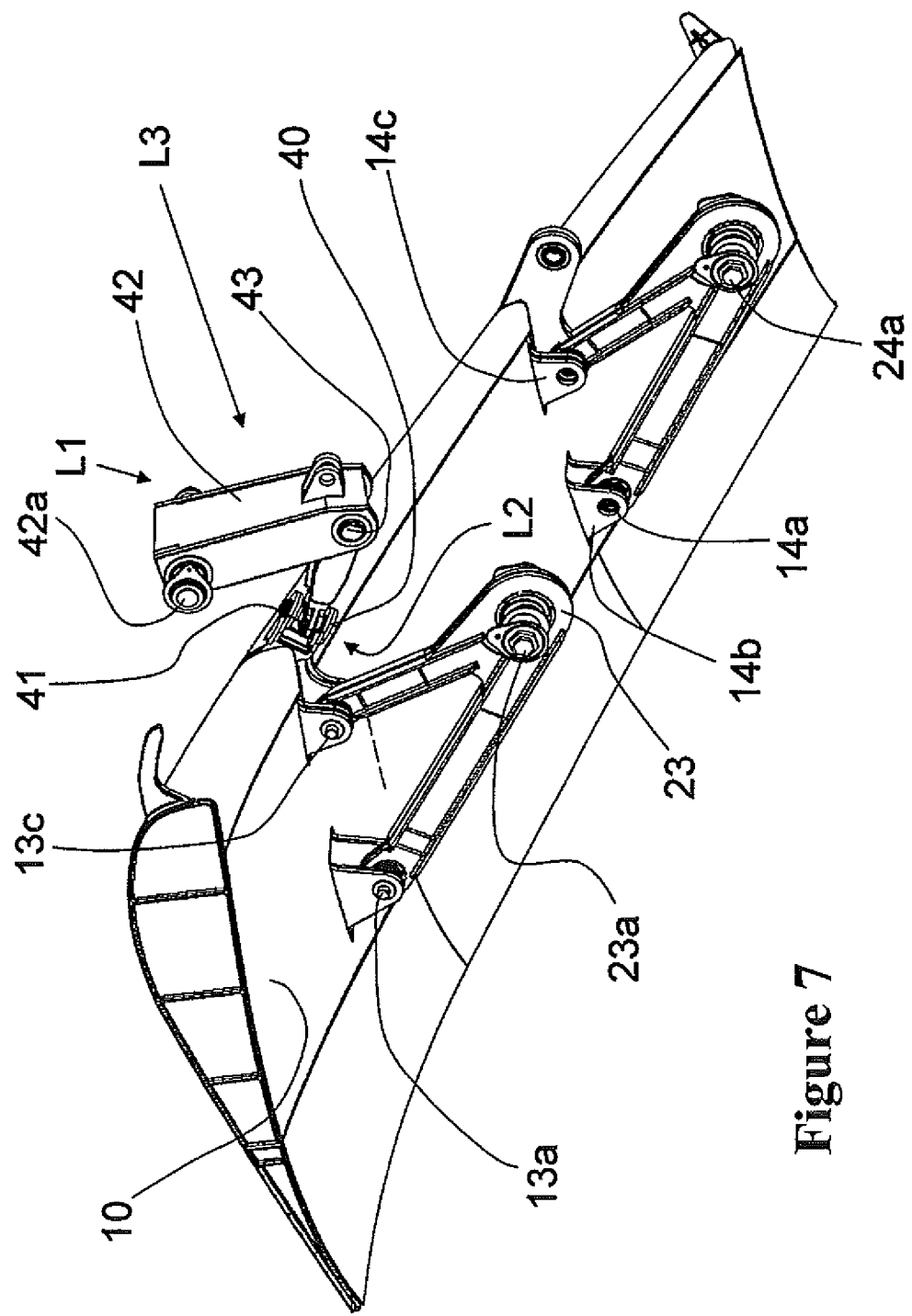
FIG. 7 shows another enlarged perspective representation of the exemplary embodiments of the connecting device and the lateral coupling device illustrated in FIG. 6.

The suspension carrier may be formed, e.g., of a lever, a plate (e.g., FIG. 4) or two levers that are arranged angular to one another (FIG. 6).

In another exemplary embodiment, the second articulated connection 23, 24, by means of which the suspension carrier is coupled to the carrier part, may allow three rotational degrees of freedom. In this case, the second articulated connection may be realized, in particular, in the form of a ball-and-socket joint. The second articulated connection 23, 24 may be alternatively composed of several joints that collectively provide three rotational degrees of freedom.

According to FIGS. 5 to 8, the first articulated connection 13, 14 for coupling the suspension carrier 21, 22 to the aerodynamic body B may feature two articulations that are spaced apart in the chord direction of the air flap and have revolute joints with rotational axes 13a and 14a that extend parallel to one another and, in particular, are identical. The rotational axes 13a and 14a respectively extend, in particular, transverse to the wingspread direction S of the aerodynamic body. In another exemplary embodiment, the second articulation arrangement for coupling the suspension carrier to the aerodynamic body B may feature two ball-and-socket joints that are spaced apart in the chord direction of the air flap.

Figure 3:
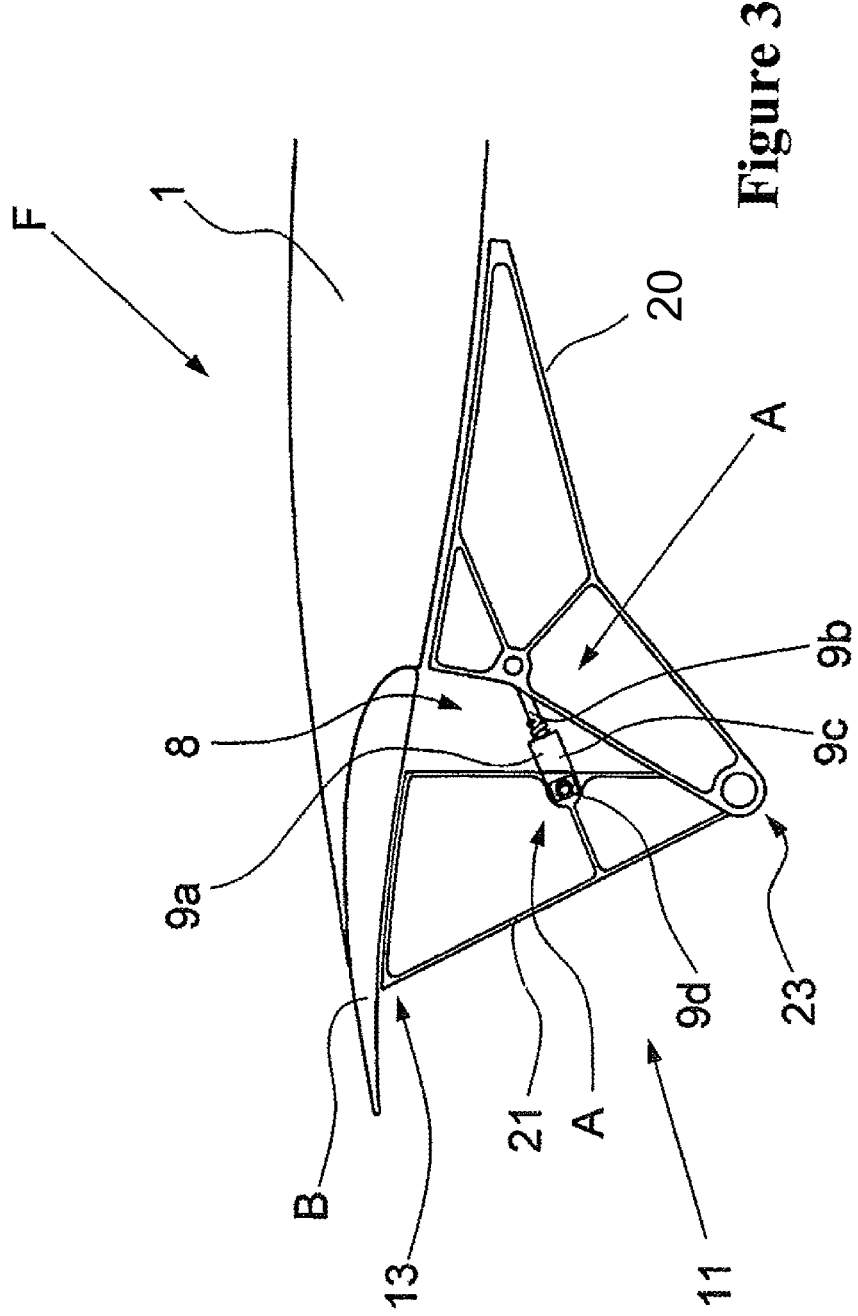
FIG. 3 shows a schematic lateral section through a trailing edge flap with a connecting device according to FIG. 2, wherein the drive unit features a thrust actuator and a driving lever driven by this thrust actuator.
Figure 10:
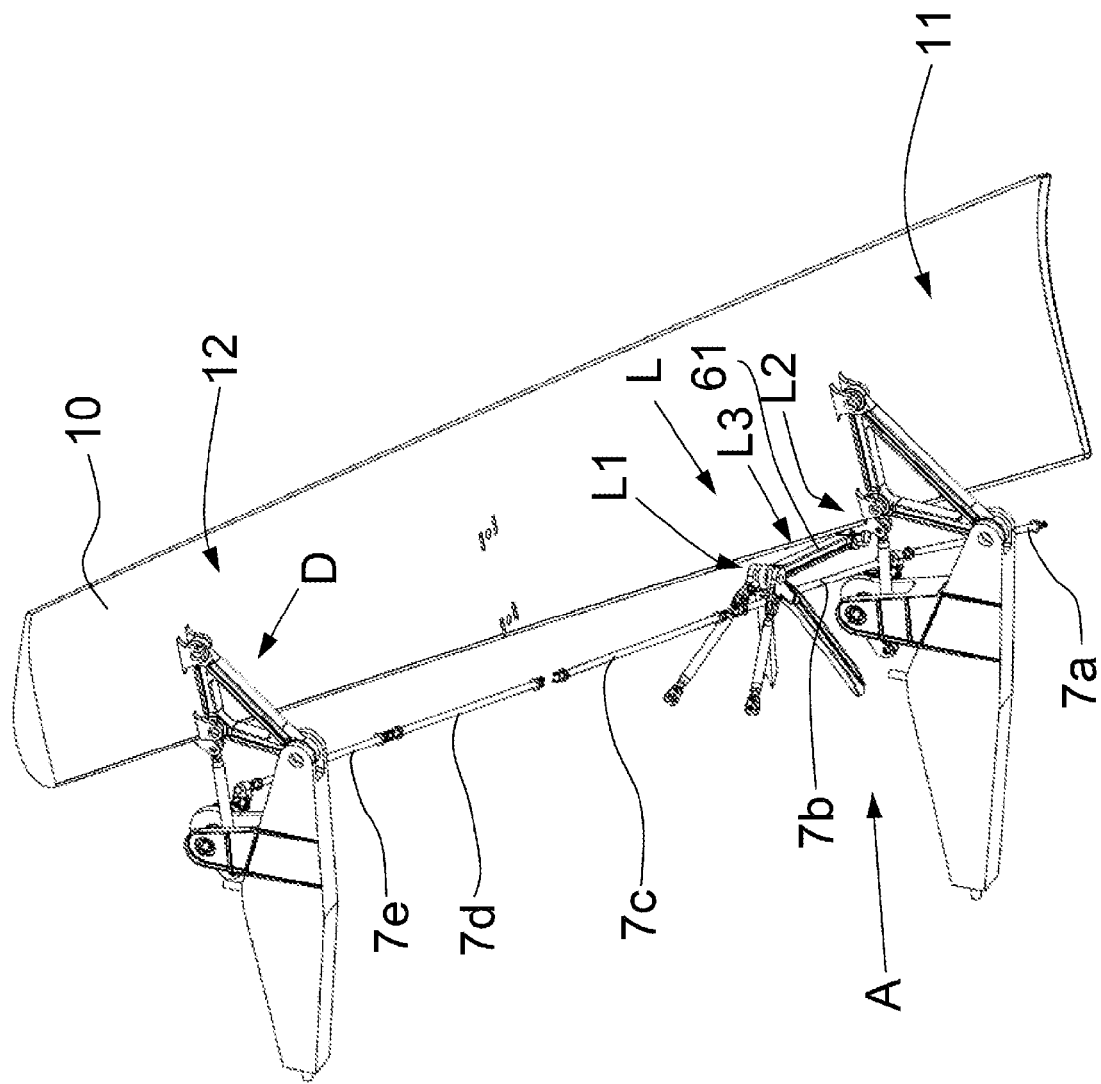
FIG. 10 shows an oblique bottom view of an aerodynamic body that forms part of an embodiment of the inventive airfoil, as well as another embodiment of the lateral coupling device and the connecting device.

The drive unit for adjusting the aerodynamic body B may be realized with a torsion shafting 7 with a number of torsion shafts 7a, 7b, 7c, 7d, 7e that are driven by a (not-shown) central driving motor and an actuating drive arranged on the aerodynamic body B as illustrated in the form of an example of a trailing edge flap in the exemplary embodiment according to FIG. 10. The actuating drive for adjusting the aerodynamic body B may be coupled to the suspension carrier 21 of the connecting device 11 or 12 as illustrated in FIG. 3 or directly to the aerodynamic body B as illustrated in FIG. 3 and FIG. 10.

Figure 2:
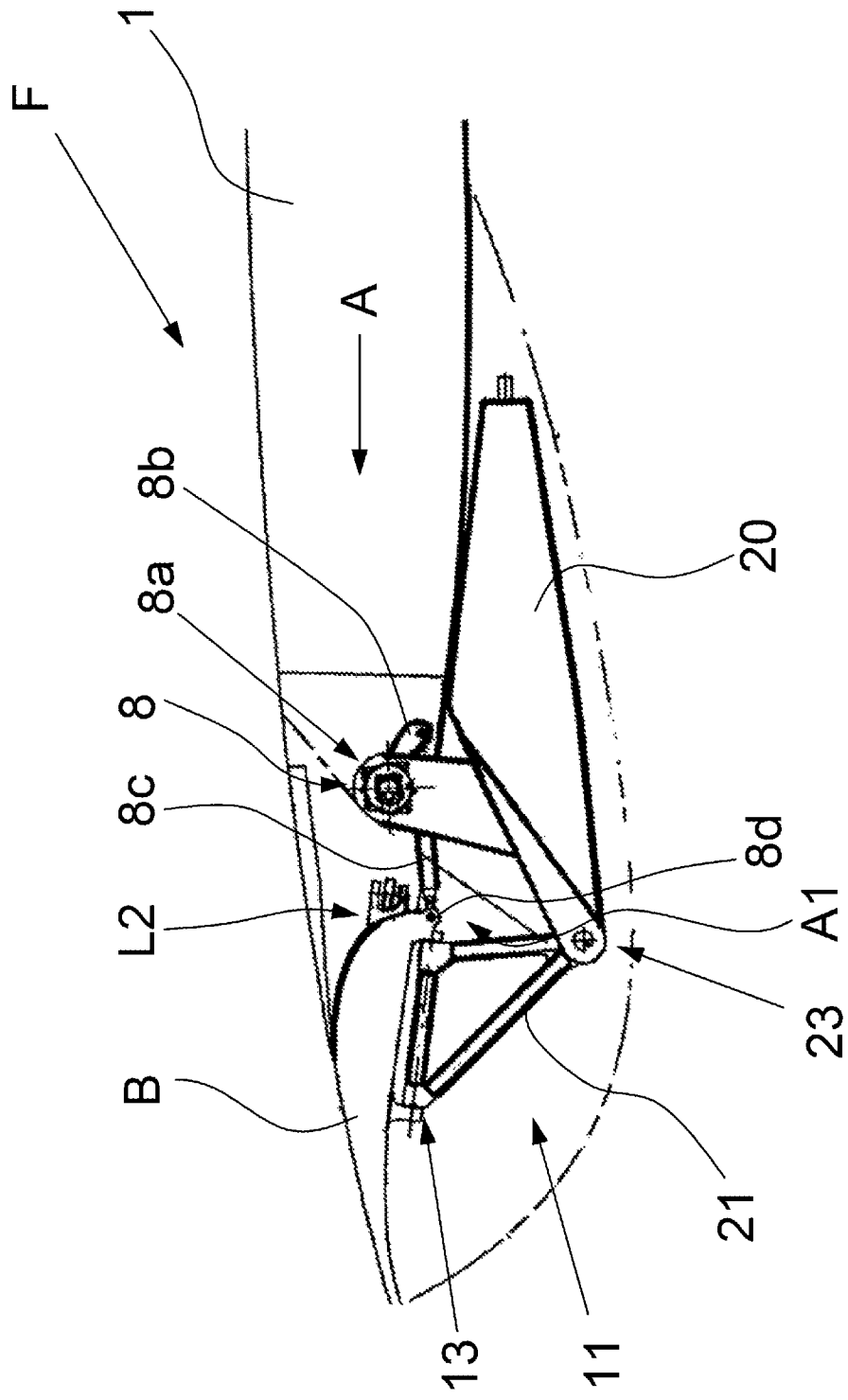
FIG. 2 shows a schematic lateral section through a trailing edge flap with a connecting device that serves for guiding the aerodynamic body during the adjustment relative to the main wing and features a carrier part, a suspension carrier and an articulated connection for coupling the suspension carrier to the carrier part, wherein the drive unit features a rotary actuator and a driving lever driven by this rotary actuator.

The drive unit A with the actuating drive 8 and the coupling thereof to the aerodynamic body B may be realized as illustrated in FIG. 2. In this case, the drive unit A features: a rotary actuator or rotary drive 8a that is also referred to as "Rotary Actuator" and features a rotating adjusting lever 8b and a drive rod 8c that is coupled to the adjusting lever 8b and to an articulated joint A1 provided on the aerodynamic body B (FIG. 2) or on one of the suspension carriers 20 by means of an articulated connection 8d. Such a realization of the drive unit A with a rotary drive 8a is also illustrated in the exemplary embodiment according to FIGS. 10 to 12. The actuating drive 8 may also be realized in the form of a spindle drive 9a. This spindle drive may be realized with a torsion rod 9b that is driven, e.g., by the torsion rods 7a to 7e illustrated in FIG. 10 and a corresponding (not-shown) coupling gear. The spindle drive 9a is coupled to an articulated joint A1 provided on the aerodynamic body B or on one of the suspension carriers 21 (FIG. 3) via a drive rod 9c, namely by means of an articulated connection 9d, and converts the rotatory input motion into a linear output motion that is once again converted into a relative motion, e.g., a pivoting motion of the aerodynamic body B relative to the main wing 1, by the connecting device.

The articulated connections 8d, 9d may feature, in particular, an articulation with three rotational degrees of freedom. Such an articulated connection may be realized in the form of a ball-and-socket joint or a composite joint such as, e.g., a combination of a cardan joint and a torsion joint. The drive unit A may also feature different actuating drives and couplings thereof to the aerodynamic body B and be realized, e.g., in the form of combinations of the described embodiments. The actuating drive may be supported on the main wing and, in particular, on the carrier part 20 or on the aerodynamic body or the suspension carrier 21, 22. The drive that generates the mechanical power may generally also consist of the actuating drive if a corresponding energy supply from a hydraulic or electric system of the aircraft is provided. In these instances, the actuating drive may be realized in the form of an electric actuator or a hydraulic actuator.

Figure 8:
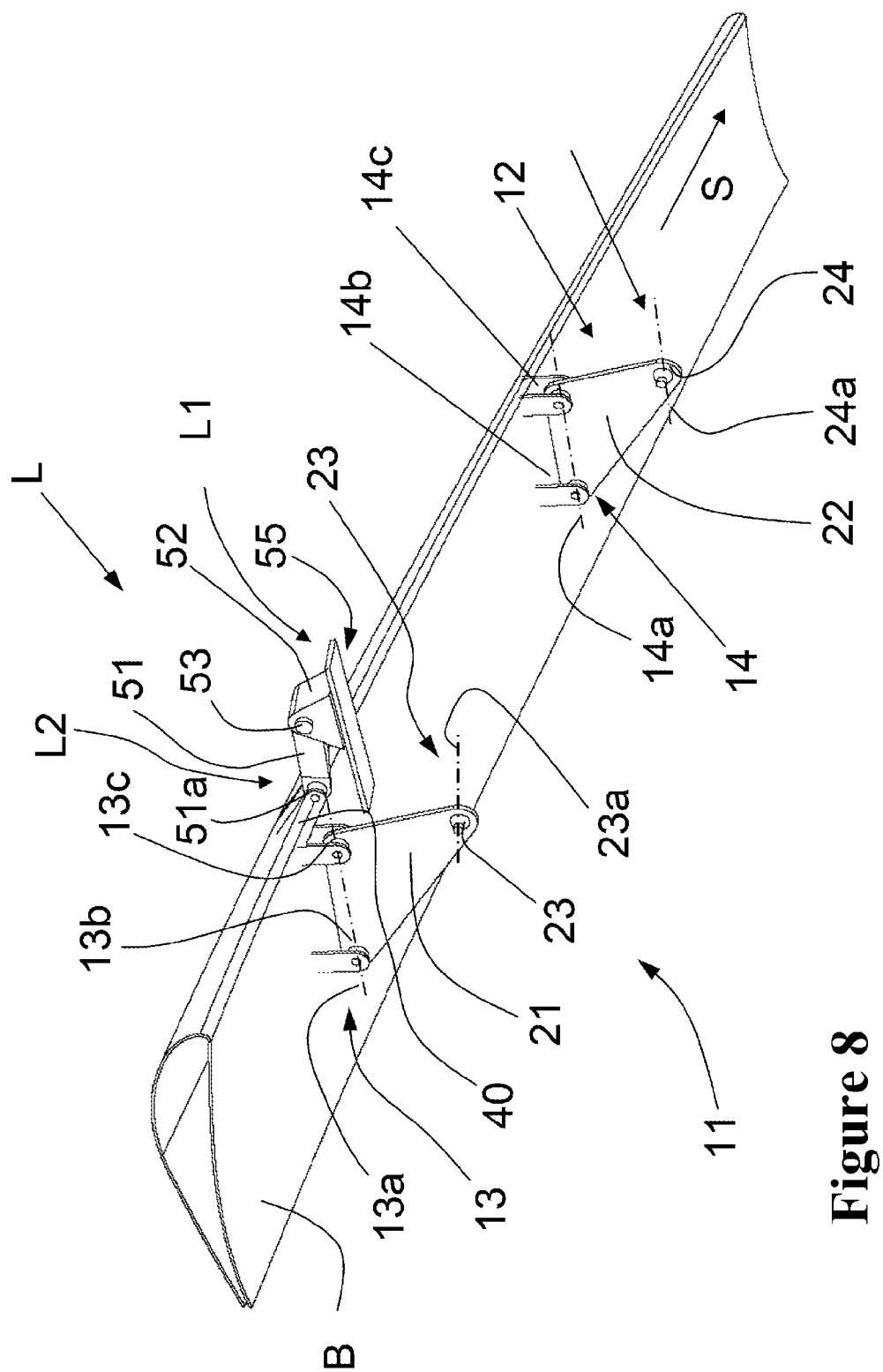
FIG. 8 shows an oblique bottom view of an aerodynamic body that forms part of an embodiment of the inventive airfoil, as well as another embodiment of the lateral coupling device and the connecting device.
Figure 9:
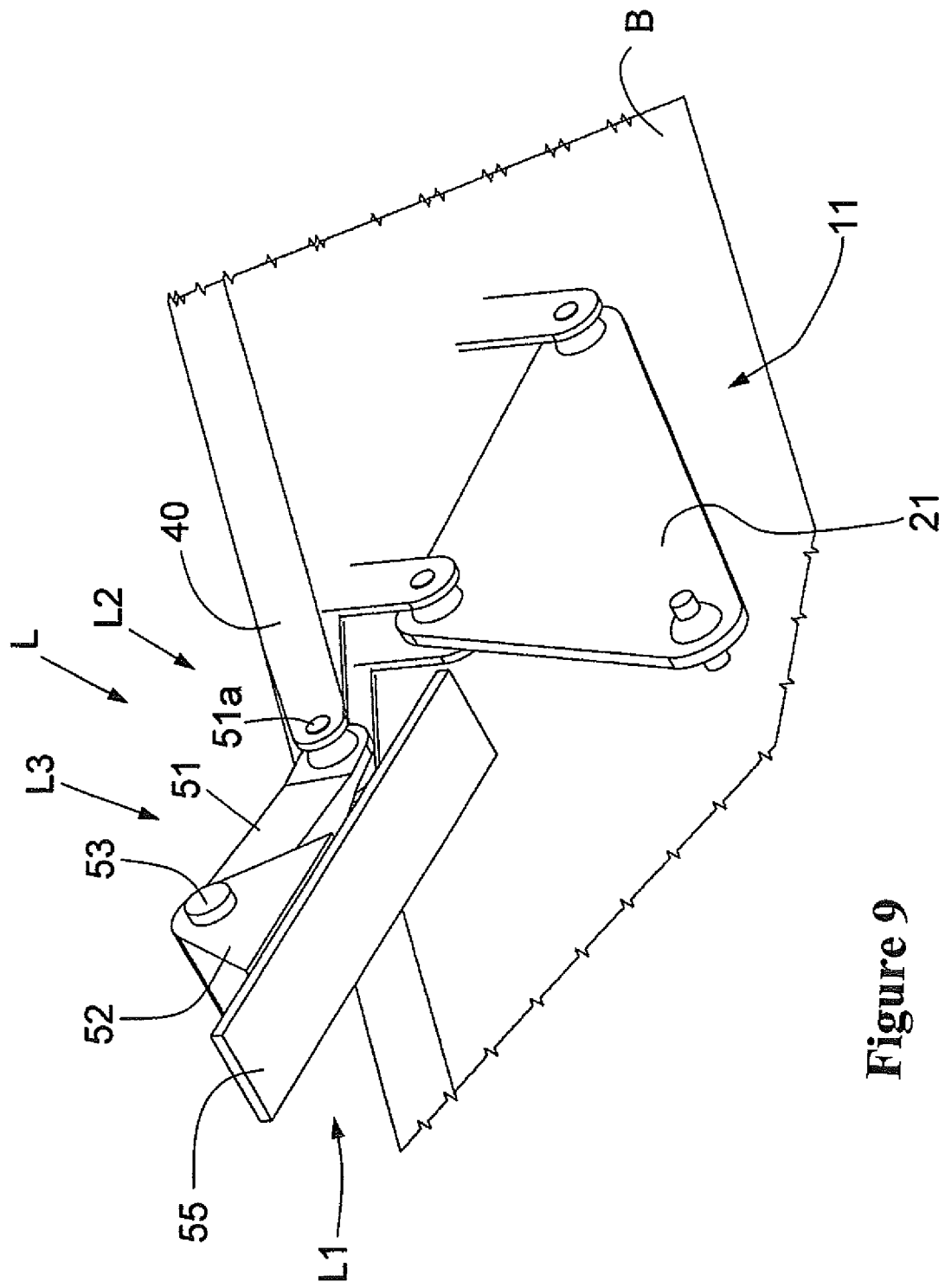
FIG. 9 shows an enlarged perspective representation of a detail of FIG. 8 with the exemplary embodiment of a connecting device and the exemplary embodiment of a lateral coupling device.

The inventive airfoil furthermore features a lateral coupling device L for holding and guiding the at least one aerodynamic body B relative to the main wing 1 in its wingspread direction S during the adjustment thereof, with said lateral coupling device featuring: a coupling connection L3, a first coupling joint L1 for coupling a first end of the coupling connection to the main wing 1 or an aircraft component connected thereto or another aerodynamic body, as well as a second coupling joint L2 for coupling a second end of the coupling connection to the aerodynamic body B. The lateral coupling device is designed in such a way that it has a total of five degrees of freedom and allows an adjusting motion of the aerodynamic body B relative to the main wing 1 transverse to the wingspread direction S thereof. The five degrees of freedom may be five rotational degrees of freedom (FIGS. 4 to 7 and 10 to 12) or, e.g., four rotational degrees of freedom and one translatory degree of freedom (FIGS. 8 and 9). The five rotational degrees of freedom may generally consists of rotatory and/or translatory degrees of freedom that are realized, in particular, by means of coupling connections including articulations and guiding devices and defined in such a way that the aerodynamic body B is held or guided relative to the main wing 1 in the wingspread direction S of the main wing or the aerodynamic body B when the aerodynamic body B is adjusted relative to the main wing 1. The lateral coupling device L may generally also provide more than five degrees of freedom in the coupling between the aerodynamic body B and the main wing 1 as long as a lateral guide, i.e., a guide in the wingspread direction of the aerodynamic body or the main wing, is provided for the aerodynamic body during its adjustment and a predetermined adjustment and a predetermined adjusting range are permitted.

With respect to the kinematics provided by the lateral coupling device L, this lateral coupling device L with the coupling connection L3, the first coupling joint L1 and the second coupling joint L2 is realized in such a way that it has a total of five degrees of freedom that are defined such that the lateral coupling device L allows an adjusting motion of the aerodynamic body relative to the main wing 1 transverse to the wingspread direction S thereof. According to the invention, this can be realized in different embodiments, wherein the described embodiments should merely be interpreted as examples:

The second coupling joint L2 may be connected to the aerodynamic body or to the connecting device 11, 12 and therefore feature a connector 40 that is arranged on the aerodynamic body or on the connecting device 11, 12.

The lateral coupling device L may be realized in such a way that the first coupling joint L1 allows three rotational degrees of freedom and two degrees of freedom are realized in the coupling connection L3 and the second coupling joint L2. In this case, the first coupling joint L1 may be realized, in particular, in the form of a ball-and-socket joint as illustrated in the exemplary embodiment according to FIGS. 10 to 12. In this exemplary embodiment, the second coupling joint L2 may be realized, e.g., in the form of a cardan joint or a prismatic joint with a revolute joint.

The second coupling joint L2 may alternatively have three rotational degrees of freedom and be realized, in particular, in the form of a ball-and-socket joint. In this exemplary embodiment, the second coupling joint L2 may be realized, e.g., in the form of a cardan joint or a prismatic joint with a revolute joint.

One of the two coupling joints L1, L2 of the lateral coupling device L may be realized in the form of a cardan joint with an additional degree of freedom. This additional degree of freedom may be realized with a connecting rod that can be adjusted in its longitudinal direction. This additional degree of freedom may also be realized with a prismatic joint or a guiding device that provides a translatory degree of freedom.

The adjustable connecting rod, the prismatic joint or the guiding device may, in particular, also be coupled to an actuating drive for actuating the lateral coupling device L in order to adjust the aerodynamic body B. Alternatively, a pretensioning device may also pretension the connecting rod, the prismatic joint or the guiding device into a state that corresponds to an adjusting state of the aerodynamic body B, e.g., its retracted or extended state.

According to another exemplary embodiment of the lateral coupling device L that is illustrated in FIGS. 4 to 7, the coupling connection L3 may be formed of two coupling levers 41, 42 that are connected to one another in an articulated fashion, wherein either the first coupling joint L1 or the second coupling joint L2 or an articulation 43 that connects the two coupling levers to one another allows three rotational degrees of freedom. In this case, the at least two other degrees of freedom are distributed over the other couplings.

According to an additional development of this exemplary embodiment, the coupling connection consisting of two coupling levers that are connected to one another in an articulated fashion is realized with:

a first coupling lever 41 that is connected to the main wing by means of an articulated connection 41a with a rotational axis that extends transverse to the chord direction of the main wing 1, and a second coupling lever 42 that is coupled to the first coupling lever 41 by means of an articulated connection 43 with a rotational axis that extends transverse to the chord direction T of the main wing 1 and to the aerodynamic body B or the suspension carrier 21, 22 by means of an articulated connection 42a that allows three rotational degrees of freedom.

In this case, the articulated connection 42a with the aerodynamic body or the suspension carrier 21, 22 or the articulated connection 41a between the first coupling lever 41 and the main wing 1 is realized in such a way that it allows three rotational degrees of freedom. The articulated connection 43) for coupling the first coupling lever 41 to the aerodynamic body B or the suspension carrier 21, 22 may feature, in particular, a ball-and-socket joint. In this case, the articulated connection 42a for coupling the first coupling lever 41 to the main wing 1 and the articulated connection 43 for coupling the first coupling lever 41 and the second coupling lever 42 furthermore may respectively feature a revolute joint with one rotational degree of freedom.

According to another exemplary embodiment of the lateral coupling device L, the coupling connection L3 may feature:

a coupling lever 51 that is coupled to the aerodynamic body B or the suspension carrier 21, 22 by means of a first coupling joint L1 with a rotational axis that extends transverse to the chord direction T of the main wing, and a connector 52 that is coupled to the coupling lever 51 by means of an articulated connection 53 with a rotational axis that extends transverse to the chord direction T of the main wing 1 and is guided on the main wing such that it can be linearly moved in a direction extending transverse to the wingspread direction by means of a slide 54 and a guiding device 55.

In the exemplary embodiment illustrated in FIGS. 8 and 9, the guiding device 55 arranged on the connector 52 is realized in the form of a slide that cooperates with a guideway arranged on the main wing. In a reversed variation, the slide may be realized or arranged on the main wing 1 and the guideway may be realized or arranged on the connector 52. The lateral coupling device L may also produce a coupling between the suspension carrier 21, 22 and the main wing 1 in both variations, wherein a guiding device 55 in the form of the slide or the guideway is provided or arranged on the suspension carrier instead of the aerodynamic body in this case.

Figure 5:
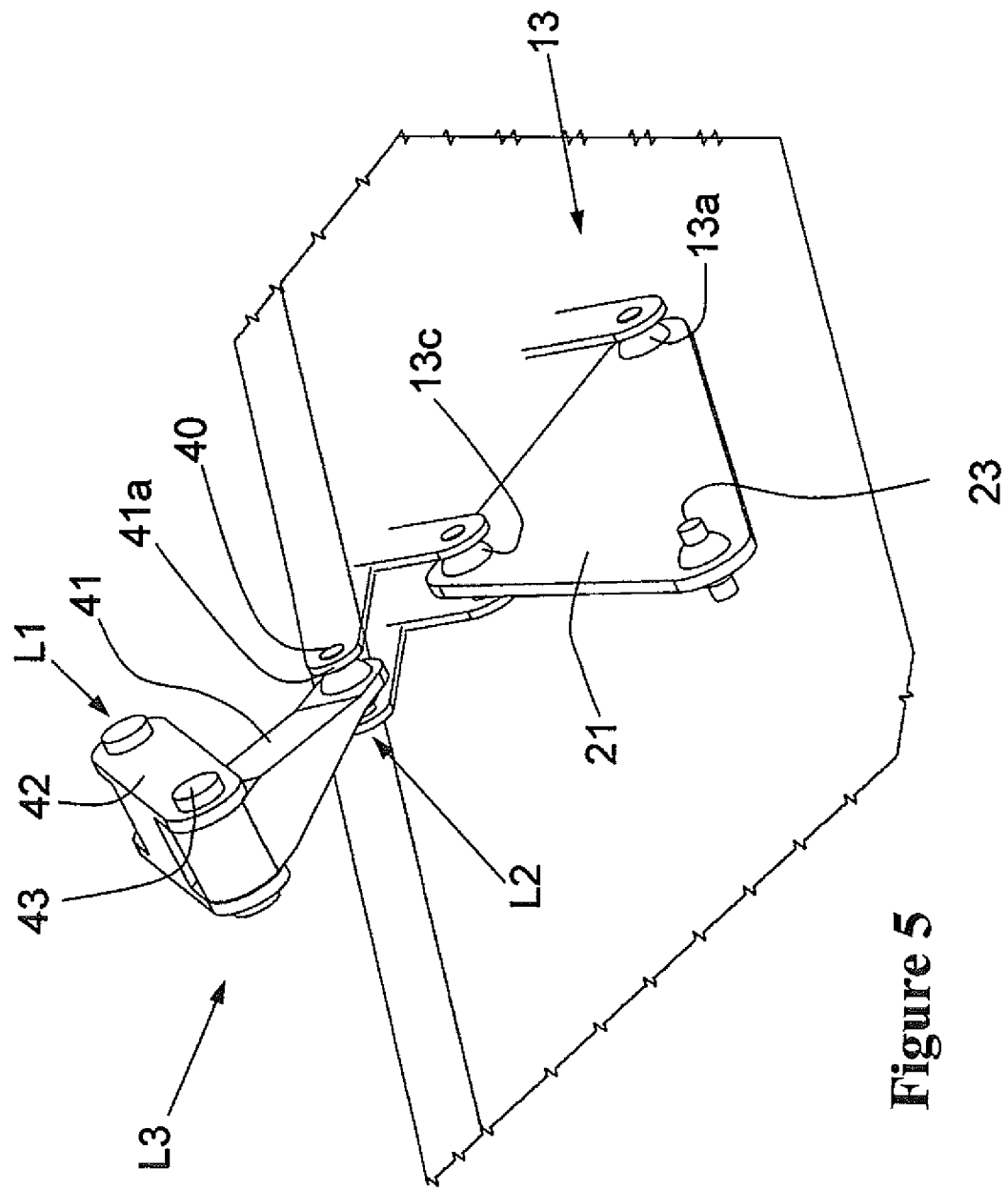
FIG. 5 shows an enlarged detail of FIG. 4 with an exemplary embodiment of a connecting device and an exemplary embodiment of a lateral coupling device.

In the exemplary embodiment according to FIGS. 4 and 5, the first coupling joint L1 features an articulated connection 51a with three degrees of freedom and the articulated connection 53 features a revolute joint 52 with one degree of freedom. Alternatively, the first coupling joint L1 may feature an articulated connection 51a with one degree of freedom and the articulated connection 53 may feature a revolute joint 53 with three degrees of freedom.

The exemplary embodiments according to FIGS. 8 and 9 may also be realized in such a way that the coupling lever 51 is coupled to the main wing 1 by means of an articulation 51a and the connector 52 is coupled to the guiding device 55 on the aerodynamic body B or the suspension carrier 21.

Figure 11:
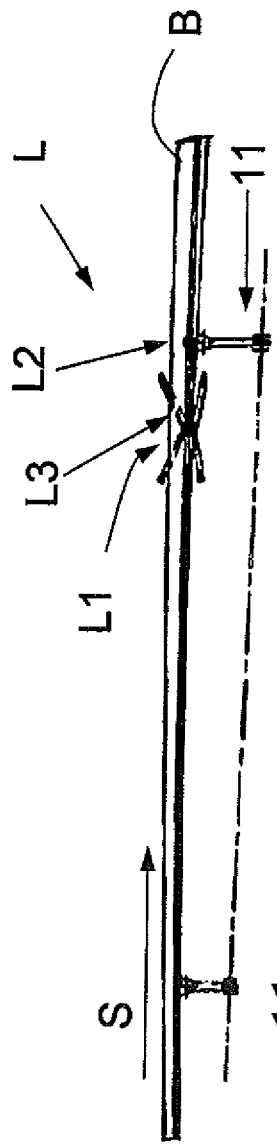
FIG. 11 shows an aerodynamic body in the form of a trailing edge flap with the lateral coupling device according to FIG. 10 viewed from the front or in the flow direction.
Figure 12:
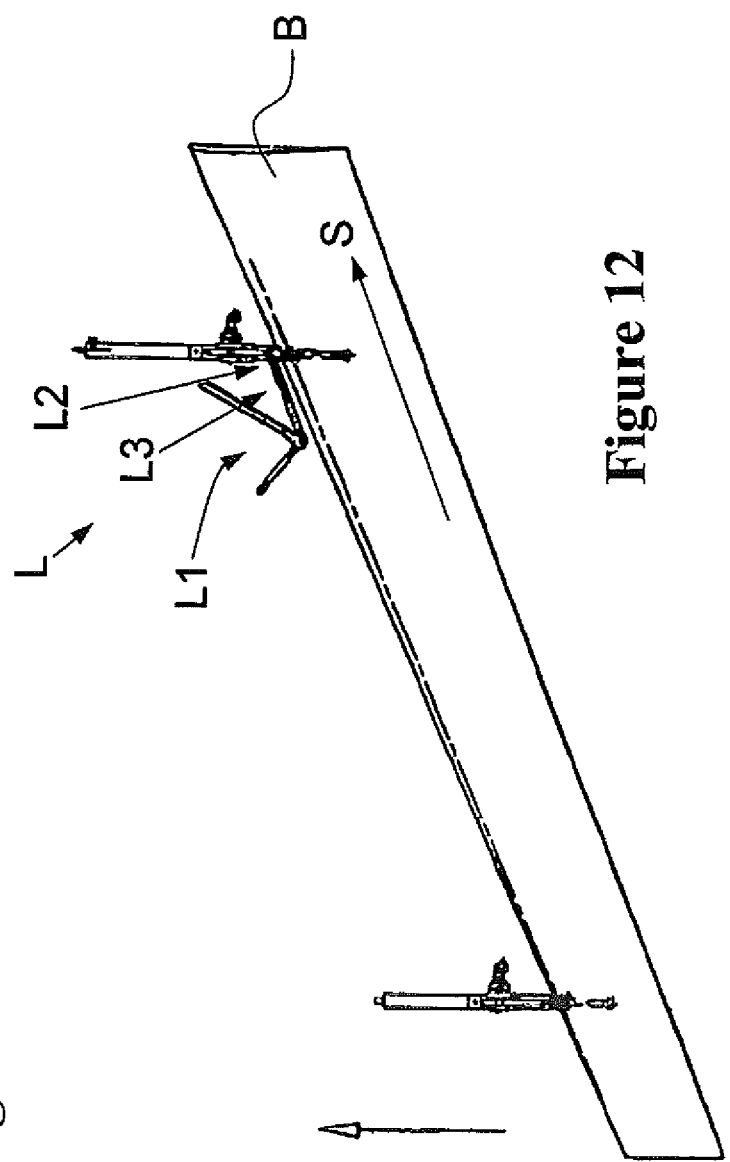
FIG. 12 shows a top view of the trailing edge flap with the lateral coupling device according to FIG. 9.

FIGS. 10 to 12 show another embodiment of the lateral coupling device L. In this case, the coupling connection L3 is formed of a connecting lever 61 and the first coupling joint L1 and the second coupling joint L1 are spaced apart from one another in the wingspread direction of the main wing such that the lateral coupling device L allows an adjusting motion of the aerodynamic body relative to the main wing 1 transverse to the wingspread direction S thereof. The part of the first coupling joint L1 on the side of the main wing may feature a plurality of mounting braces 65 that are mounted on the main wing and extend angular to one another, wherein at least some mounting braces have directional components in the wingspread direction S of the main wing.

In the exemplary embodiment according to FIGS. 10 to 12, the first coupling joint L1 is realized in the form of an articulated connection 61a and the first coupling joint L2 is realized in the form of an articulated connection 61b. During a pivoting motion of the aerodynamic body B about the rotational axis D, the connecting lever 61 in the articulated connections 61a, 61b is turned and the aerodynamic body B is held in the wingspread direction S by the connecting lever 61 during its adjustment.

According to the invention, the first coupling joint L2 or the second coupling joint L2 may be realized with three rotational degrees of freedom.

In this case, it would be possible, e.g., to realize the first coupling joint L1 in the form of an articulated connection 61a with three rotational degrees of freedom, particularly in the form of a ball-and-socket joint. In this case, the second coupling joint L2 may be realized in the form of an articulated connection 61b with two rotational degrees of freedom. Vice versa, the second coupling joint L2 may be realized in the form of an articulated connection 61b with three rotational degrees of freedom, particularly in the form of a ball-and-socket joint, and the first coupling joint L1 may be realized in the form of an articulated connection 61a with two rotational degrees of freedom. The articulated connection with two degrees of freedom may generally be realized, e.g., in the form of a cardan joint.

In an additional development of this exemplary embodiment, the connecting lever 61 may be realized variable with respect to its length. In this case, it would be possible to pretension the connecting lever 61 to a length that corresponds to a retracted position of the aerodynamic body. The connecting lever 61 may alternatively or additionally be realized in the form of a drive rod that can be driven by means of an actuating drive and serves for actuating the connecting device 21, 22. The actuating drive may be integrated into the drive rod 61 in order to vary the length thereof. The actuating drive may also be respectively coupled to the connecting lever 61 and the drive rod in order to pivot the connecting lever 61 and be arranged on the aerodynamic body B, the suspension carrier 21, 22 or the main wing 1 for this purpose. In these instances, the actuating drive may be realized, e.g., in the form of a rotary actuator and feature the first or second coupling joint or the first or second revolute joint 61a, 61b depending on its allocation.

According to an additional development of the invention, an airfoil of the above-described type is proposed, on which two or more aerodynamic bodies are arranged behind one another referred to the chord direction and coupled to one another by means of a lateral coupling device L according to one of the inventive embodiments and embodiments that are used analogously.

In this case, one of the two coupling joints of the lateral coupling device L, e.g., the first coupling joint L1, is coupled to a first aerodynamic body and the other coupling joint of the lateral coupling device L, e.g. the second coupling joint L2, is coupled to a second aerodynamic body that lies adjacent to the first aerodynamic body referred to the wingspread direction S.

The lateral coupling device L may be realized in accordance with one of the above-described exemplary embodiments, however, with the exception that the first or the second coupling joint L1, L2 is not coupled to the main wing 1, but rather to a second aerodynamic body that lies adjacent to the first aerodynamic body referred to the wingspread direction S.

The coupling of a second aerodynamic body that lies adjacent to the first aerodynamic body by means of a lateral coupling device L may be realized with or without a coupling of one or both aerodynamic bodies to the main wing by means of a lateral coupling device L according to one of the above-described embodiments.

According to the invention, a lateral coupling device L for holding and guiding at least one aerodynamic body relative to the main wing in its wingspread direction S during the adjustment thereof is generally proposed, with said lateral coupling device featuring: a coupling connection L3, a first coupling joint L1 for coupling a first end of the coupling connection to the main wing or an aircraft component connected thereto or another aerodynamic body, as well as a second coupling joint L2 for coupling the second end of the coupling connection to the aerodynamic body B, wherein the lateral coupling device L has a total of five degrees of freedom and allows an adjusting motion of the aerodynamic body relative to the main wing 1 transverse to the wingspread direction S thereof. The coupling of the main wing or an aircraft component connected thereto or another aerodynamic body provided in dependence on the above-described applications is realized by means of the inventive lateral coupling device L according to one of the above-described exemplary embodiments.

The invention claimed is:

1. An airfoil of an aircraft with a main wing and at least one aerodynamic body that can be adjusted relative to the main wing transverse to its wingspread direction by means of a drive unit, with said airfoil featuring:

carrier parts disposed on the main wing for movably mounting the at least one aerodynamic body on the main wing;

at least two connecting devices that are spaced apart from one another in a wingspread direction of the main wing and serve for guiding the aerodynamic body during the adjustment relative to the main wing, wherein said connecting devices support the aerodynamic body and include: a suspension carrier and at least one articulated connection which allows at least one rotational degree of freedom of the aerodynamic body relative to the main wing with a rotational axis that has a directional component transverse to the wingspread direction of the aerodynamic body; and a lateral coupling device for holding and guiding the aerodynamic body relative to the main wing in the wingspread direction during the adjustment thereof, with said lateral coupling device featuring: (i) a coupling connection, (ii) a first coupling joint for coupling a first end of the coupling device to at least one of the main wing, another aircraft component connected to the main wing, and another aerodynamic body, and (iii) a second coupling joint for coupling a second end of the coupling device to one of: the aerodynamic body and another aerodynamic body, wherein the lateral coupling device has a total of five degrees of freedom and allows an adjusting motion of the aerodynamic body relative to the main wing transverse to the wingspread direction thereof.

2. The airfoil according to claim 1, wherein at least two connecting devices for adjusting the aerodynamic body respectively feature: one respective carrier part that is mounted on the main wing, a suspension carrier, a first articulated connection with at least one rotational degree of freedom for coupling the aerodynamic body to the suspension carrier and a second articulated connection, by means of which the suspension carrier is coupled to the carrier part with at least one rotational degree of freedom, wherein the rotational degree of freedom of the second articulated connection about a rotational axis has a directional component in the wingspread direction of the aerodynamic body.

3. The airfoil according to claim 2, wherein the second articulated connection, by means of which the suspension carrier is coupled to the carrier part, allows three rotational degrees of freedom.

4. The airfoil according to claim 3, wherein the second articulated connection is realized in the form of a ball-and-socket joint.

5. The airfoil according to claim 2, wherein the first articulated connection for coupling the suspension carrier to the aerodynamic body has two articulations that feature revolute joints with rotational axes that extend parallel to one another and are spaced apart from one another in a chord direction of the aerodynamic body.

6. The airfoil according to claim 5, wherein the second articulated connection for coupling the suspension carrier to the aerodynamic body features two ball-and-socket joints that are spaced apart in the chord direction of the aerodynamic body.

7. The airfoil according to claim 2, wherein a drive unit for adjusting the aerodynamic body actuates the suspension carrier of the connecting device.

8. The airfoil according to claim 7, wherein at least one of the connecting devices is coupled to the drive unit by means of a drive rod that is coupled to one of: the suspension carrier of the connecting device and the aerodynamic body by means of an articulated connection with three rotational degrees of freedom.

9. The airfoil according to claim 8, wherein the articulated connection allows three rotational degrees of freedom.

10. The airfoil according to claim 7, wherein at least one of the connecting devices is coupled to the drive unit by means of a drive rod that is coupled to the aerodynamic body by means of an articulated connection with three rotational degrees of freedom.

11. The airfoil according to claim 7, wherein the drive unit features an actuating drive that is supported on the main wing.

12. The airfoil according to claim 7, wherein the drive unit for adjusting the aerodynamic body relative to the main wing is formed of a rotary drive with a driving arm, to which a drive rod for transmitting the driving power is coupled, wherein said drive rod is coupled to the aerodynamic body.

13. The airfoil according to claim 7, wherein the drive unit for adjusting the aerodynamic body relative to the main wing is formed of a thrust drive that is coupled to the aerodynamic body.

14. The airfoil according to claim 1, wherein each drive unit of a connecting device features an actuating drive for power generation purposes.

15. The airfoil according to claim 1, wherein a central driving motor is provided for power generation purposes, wherein the output power of said driving motor is transmitted to the actuating drive of each connecting device via a torsion shafting.

16. The airfoil according to claim 1, wherein the first coupling joint features a connector that is arranged on the aerodynamic body.

17. The airfoil according to claim 1, wherein the second coupling joint features a connector that is arranged on the connecting device.

18. The airfoil according to claim 17, wherein the articulated connection for coupling the first coupling lever to the aerodynamic body or the suspension carrier features a ball-and-socket joint.

19. The airfoil according to claim 1, wherein the first coupling joint allows three rotational degrees of freedom.

20. The airfoil according to claim 19, wherein the first coupling joint is realized in the form of a ball-and-socket joint.

21. The airfoil according to claim 19, wherein the articulated connection for coupling the first coupling lever to the main wing and the articulated connection for coupling the first coupling lever and the second coupling lever respectively feature a revolute joint with one rotational degree of freedom.

22. The airfoil according to claim 1, wherein the second coupling joint allows three rotational degrees of freedom.

23. The airfoil according to claim 22, wherein the second coupling joint is realized in the form of a ball-and-socket joint.

24. The airfoil according to claim 1, wherein one of the two coupling joints is realized in the form of a cardan joint with a connecting rod that can be adjusted in its longitudinal direction.

25. The airfoil according to claim 1, wherein the coupling connection is formed of two coupling levers that are connected to one another in an articulated fashion, wherein either the first coupling joint or the second coupling joint or an articulation that connects the two coupling levers to one another allows three rotational degrees of freedom.

26. The airfoil according to claim 1, wherein the coupling connection is formed of two coupling levers that are connected to one another in an articulated fashion, with:

a first coupling lever that is connected to the main wing by means of an articulated connection with a rotational axis that extends transverse to a chord direction of the main wing, and a second coupling lever that is coupled to the first coupling lever by means of an articulated connection with a rotational axis that extends transverse to the chord direction of the main wing and to the aerodynamic body or the suspension carrier by means of an articulated connection that allows three rotational degrees of freedom, wherein the articulated connection with the aerodynamic body or the suspension carrier or the articulated connection between the first coupling lever and the main wing allows three rotational degrees of freedom.

27. The airfoil according to claim 1, wherein the coupling connection features:
   a coupling lever that is coupled to the aerodynamic body or the suspension carrier by means of a first coupling joint with a rotational axis that extends transverse to a chord direction of the main wing, and
   a connector that is coupled to the coupling lever by means of an articulated connection with a rotational axis that extends transverse to the chord direction of the main wing and guided on the main wing such that it can be linearly moved in a direction extending transverse to the wingspread direction by means of a slide and a guiding device.

28. The airfoil according to claim 27, wherein the first coupling joint features an articulated connection with three degrees of freedom and the articulated connection features a revolute joint with one degree of freedom.

29. The airfoil according to claim 27, wherein the first coupling joint features an articulated connection with one degree of freedom and the articulated connection features a revolute joint with three degrees of freedom.

30. The airfoil according to claim 1, wherein the coupling connection of the lateral coupling device features a connecting lever, wherein the first coupling joint and the second coupling joint are spaced apart from one another in the wingspread direction of the main wing such that the lateral coupling device allows an adjusting motion of the aerodynamic body relative to the main wing transverse to the wingspread direction.

31. The airfoil according to claim 30, wherein the second coupling joint has three rotational degrees of freedom.

32. The airfoil according to claim 30, wherein the second coupling joint features a ball-and-socket joint.

33. The airfoil according to claim 30, wherein the first coupling joint features a cardan joint.

34. The airfoil according to claim 30, wherein the connecting piece is variable with respect to its length.

35. The airfoil according to claim 34, wherein the connecting lever is prestressed to a length that corresponds to a retracted position of the aerodynamic body.

36. The airfoil according to claim 30, wherein the part of the first coupling joint on the side of the main wing features a plurality of mounting braces that are mounted on the main wing, wherein said mounting braces extent angular to one another and have directional components in the wingspread direction of the main wing.

37. The airfoil according to claim 30, wherein the connecting lever is a drive rod for actuating the connecting device such that it controls the motion of the aerodynamic body in the wingspread direction during the displacement of the landing flap.

38. The airfoil according to claim 1, wherein the aerodynamic body is a trailing edge flap.

39. An aircraft featuring a fuselage and an airfoil with a main wing and at least one aerodynamic body that can be adjusted relative to the main wing transverse to its wingspread direction by means of a drive unit, with said aircraft featuring:
   carrier parts disposed on the main wing for movably mounting the at least one aerodynamic body on the main wing;
   at least two connecting devices that are spaced apart from one another in the wingspread direction of the main wing and serve for guiding the aerodynamic body during the adjustment relative to the main wing, wherein said connecting devices support the aerodynamic body and include: (i) a suspension carrier, (ii) a first articulated connection which allows at least one rotational degree of freedom of the aerodynamic body relative to the main wing with a rotational axis that has a directional component transverse to the wingspread direction of the aerodynamic body, and (iii) and a second articulated connection that couples the suspension carrier to a respective one of the carrier parts with at least one rotational degree of freedom, wherein the rotational degree of freedom of the second articulated connection about a rotational axis has a directional component in the wingspread direction of the aerodynamic body; and
   a lateral coupling device for holding and guiding the aerodynamic body relative to an aircraft component of the fuselage in the wingspread direction during the adjustment thereof, wherein the lateral coupling device couples the aerodynamic body to the aircraft component, and wherein a first coupling joint is arranged on the aircraft component and a second coupling joint, which is arranged adjacent to the first coupling joint referred to the wingspread direction of the main wing and connected to the first coupling joint via the coupling connection, is arranged on the aerodynamic body.

40. The airfoil according to claim 39, wherein the aerodynamic body is a trailing edge flap.

* * * * *